H. DIAMANTI & C. LAMBERT.
APPARATUS FOR RECOVERING VAPORS ISSUED FROM VOLATILE LIQUIDS.
APPLICATION FILED FEB. 28, 1907.
919,832.
Patented Apr. 27, 1909.
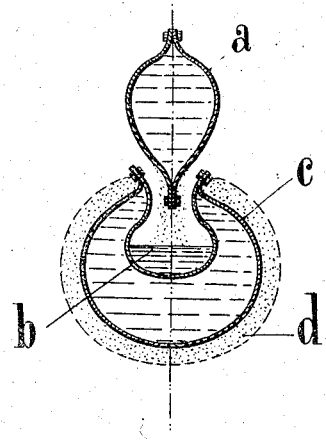
WITNESSES
INVENTORS
Henri Diamanti
Charles Lambert
BY ATTORNEY

UNITED STATES PATENT OFFICE.

HENRI DIAMANTI AND CHARLES LAMBERT, OF PARIS, FRANCE.

APPARATUS FOR RECOVERING VAPORS ISSUED FROM VOLATILE LIQUIDS.

No. 919,832.  Specification of Letters Patent.  Patented April 27, 1909.

Application filed February 28, 1907. Serial No. 359,932.

*To all whom it may concern:*

Be it known that we, HENRI DIAMANTI and CHARLES LAMBERT, citizens of the Republic of France, and residents of Paris, France, have invented a new and useful Apparatus for Recovering Vapors Issued from Volatile Liquids, which process is fully set forth in the following specification.

The object of the present invention is to condense vapors contained in a room and to prevent re-vaporization of the condensed liquid by the uncondensed vapors remaining in the room.

By means of the apparatus forming the subject of the invention the liquid of condensation is protected from the vapors and air contained in the room so that said vapors and air cannot impart warmth to said liquid and so re-vaporize the same, and this is accomplished without cooling the entire volume of air and vapor in the room. The channel for holding the liquid of condensation is placed under the condenser and said channel is so formed that above the liquid there exists a layer of air which in proportion to the remaining volume of air in the room is very small. This layer of air is cooled by a suitable cooling medium so that the temperature of said layer of air will be lowered, and thus the reëvaporation of the condensed liquid is prevented. Since this layer of air on account of its lower temperature has a greater density than the remaining air which is of a higher temperature, there is no danger that it will rise and be mixed with the warmer air.

The drawing shows a cross section of a form of device for carrying out the subject of the invention.

The cooling body *a* is made of copper, and contains a suitable cooling medium. On the cold walls of this vessel are liquefied the vapor mixed with air in the surrounding space or room. The drops formed hereby, trickle down and are collected in the collecting channel *b*, which is so formed that over the condensed liquid a layer of air exists inclosed by it, which is kept to the desired lower temperature by means of a cooling medium. This cooling medium is, by way of example, contained in a hollow space formed by a wall *c*, on the collecting channel *b*. This layer of air of a low temperature over the condensing liquid protects the same from the influence of the outside air which is of a higher temperature, so that all reëvaporation is prevented, although the entire volume of air of the room does not stand at a low temperature. It is understood that the collecting channel can be so formed that the cooling body *a* is inclosed by it on the sides, without making difficult the approach of the vapor to the cooling body.

The jacket *c* is covered by a layer of insulation *d* of cork or other suitable material.

What we claim is:

1. An apparatus for the liquefaction of vapors mixed with air and other gases comprising a condensing element in which a cooling medium is passed, a collecting channel below said element adapted to receive the condensed vapors therefrom, said channel being so formed that the body of the gas is held therein above the condensed vapor, and means for cooling the condensed vapor and said body of gas.

2. An apparatus for condensing vapors in a room, comprising a condensing element through which a cooling medium is passed, a collecting channel below said element and adapted to receive the condensed vapor therefrom, said channel having its upper edges approaching the lower portion of the condensing element so as to form an inclosed space immediately above the condensed vapor in which the body of the gas is held, and means for cooling the condensed vapor and said body of gas.

In testimony whereof we have signed this specification in the presence of two subscribing witnesses.

HENRI DIAMANTI.
CHARLES LAMBERT.

Witnesses:
DEAN PULLANOIR,
CHARLES VITAL.